United States Patent [19]

Li et al.

[11] Patent Number: 5,171,553

[45] Date of Patent: Dec. 15, 1992

[54] CATALYTIC DECOMPOSITION OF $N_2O$

[75] Inventors: Yuejin Li, Wescosville; John N. Armor, Orefield, both of Pa.

[73] Assignee: Air Products and Chemicals, Inc., Allentown, Pa.

[21] Appl. No.: 790,611

[22] Filed: Nov. 8, 1991

[51] Int. Cl.$^5$ .......................... B01J 8/00; C01B 21/00
[52] U.S. Cl. ..................................... 423/239; 423/351
[58] Field of Search ............... 423/235, 235 D, 239, 423/351, 239 A

[56] References Cited

U.S. PATENT DOCUMENTS

| | | | |
|---|---|---|---|
| 4,259,303 | 3/1981 | Nakaje et al. | 423/239 |
| 4,571,329 | 2/1986 | Kato et al. | 423/239 |
| 4,933,158 | 6/1990 | Aritsuka et al. | 423/239 |

OTHER PUBLICATIONS

Thiemens and Trogler, *Science*, 251 (1991) 932 Nox Information Book, Mar., 1983, DOE/NBB-0044.
Slinkin and co-workers, *Kinetika i Kataliz*, 19 (1978) 992 and 20 (1979) 515.
Hall and co-workers, *J. Catal.*, 86 (1984) 392.
Pomonis and co-workers, *J. Chem. Soc., Farady Tran.*, 81 (1985) 2043.
Dumesic and co-workers, *J. Catal.*, 110 (1988) 330.
Panov and co-workers, *J. Mol. Catal.*, 61 (1990) 85.

*Primary Examiner*—Gregory A. Heller
*Attorney, Agent, or Firm*—Keith D. Gourley; James C. Simmons; William F. Marsh

[57] ABSTRACT

The invention describes a highly efficient catalytic pollution control process for removing $N_2O$ from gaseous mixtures. The catalytic process, which is substantially unaffected by the presence of oxygen, comprises contacting an $N_2O$-containing gaseous mixture with a catalyst comprising a crystalline zeolite which, at least in part, is composed of five membered rings having a structure type selected from the group consisting of BETA, MOR, MFI, MEL and FER wherein the crystalline zeolite has been at least partially ion-exchanged with a metal selected from the group consisting of copper, cobalt, rhodium, iridium, ruthenium and palladium under conditions sufficient to convert the $N_2O$ into gaseous nitrogen and gaseous oxygen.

22 Claims, 3 Drawing Sheets

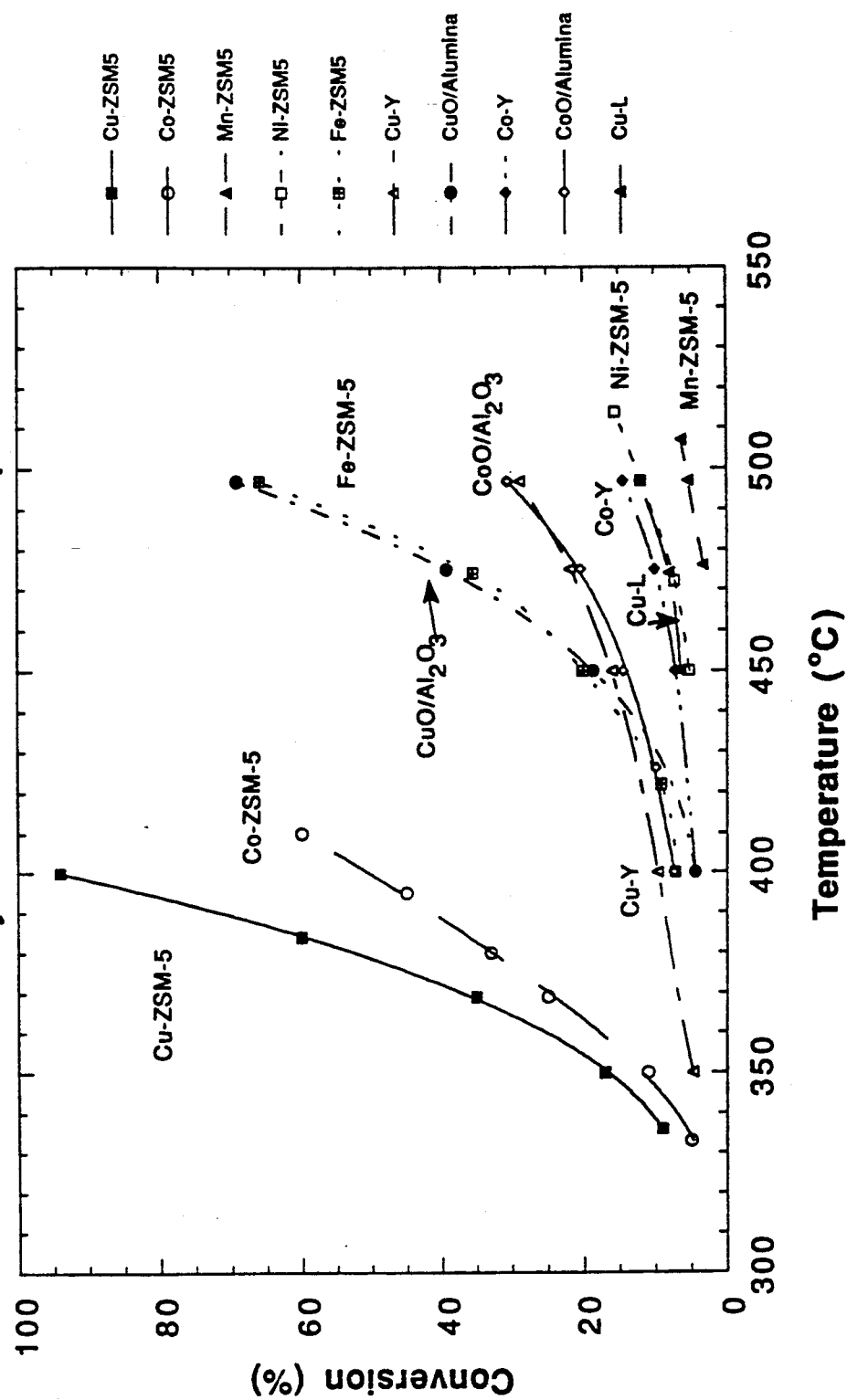

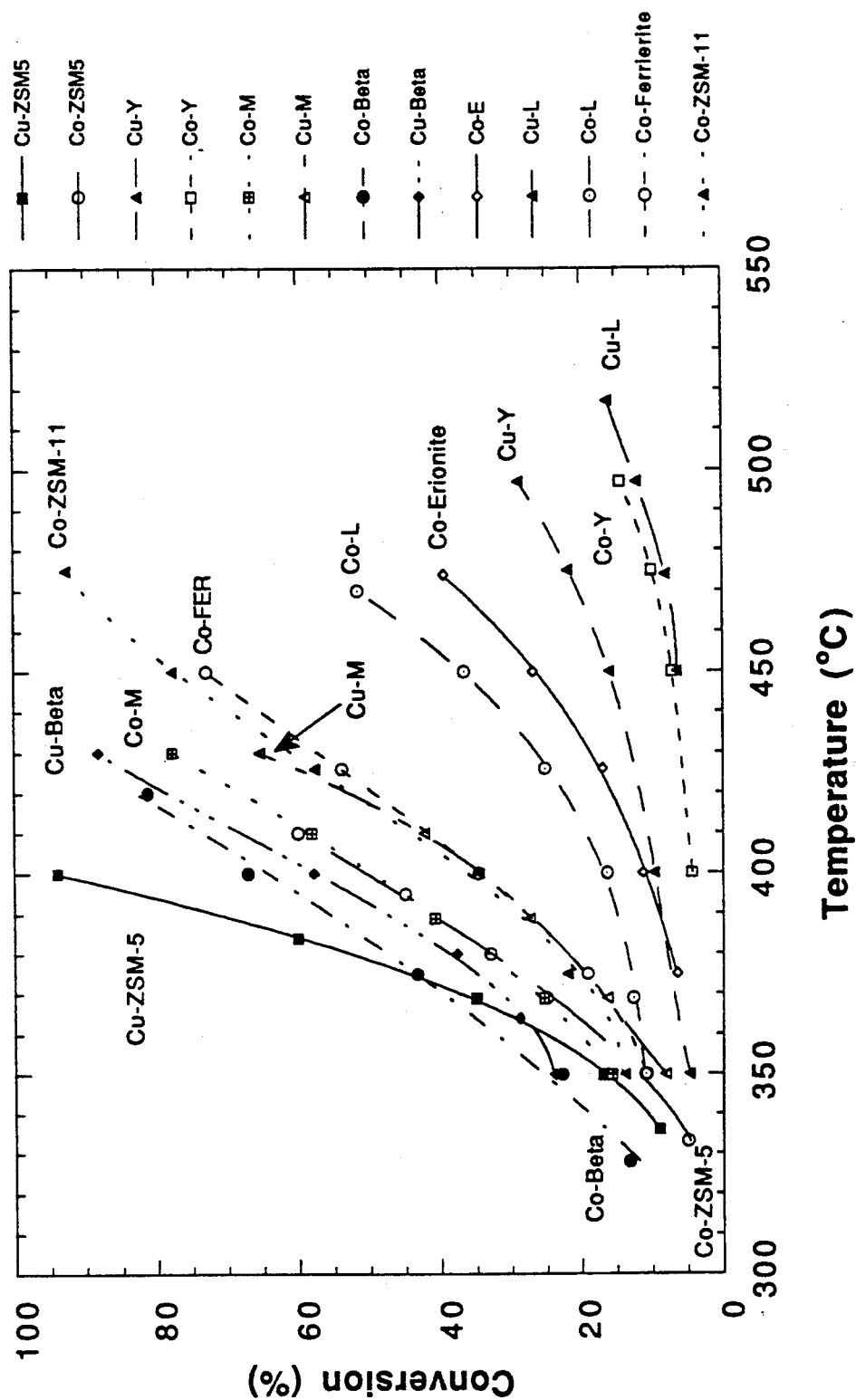
FIG. 2 Catalyst Activities for N₂O Decomposition on Metal-exchanged Zeolites

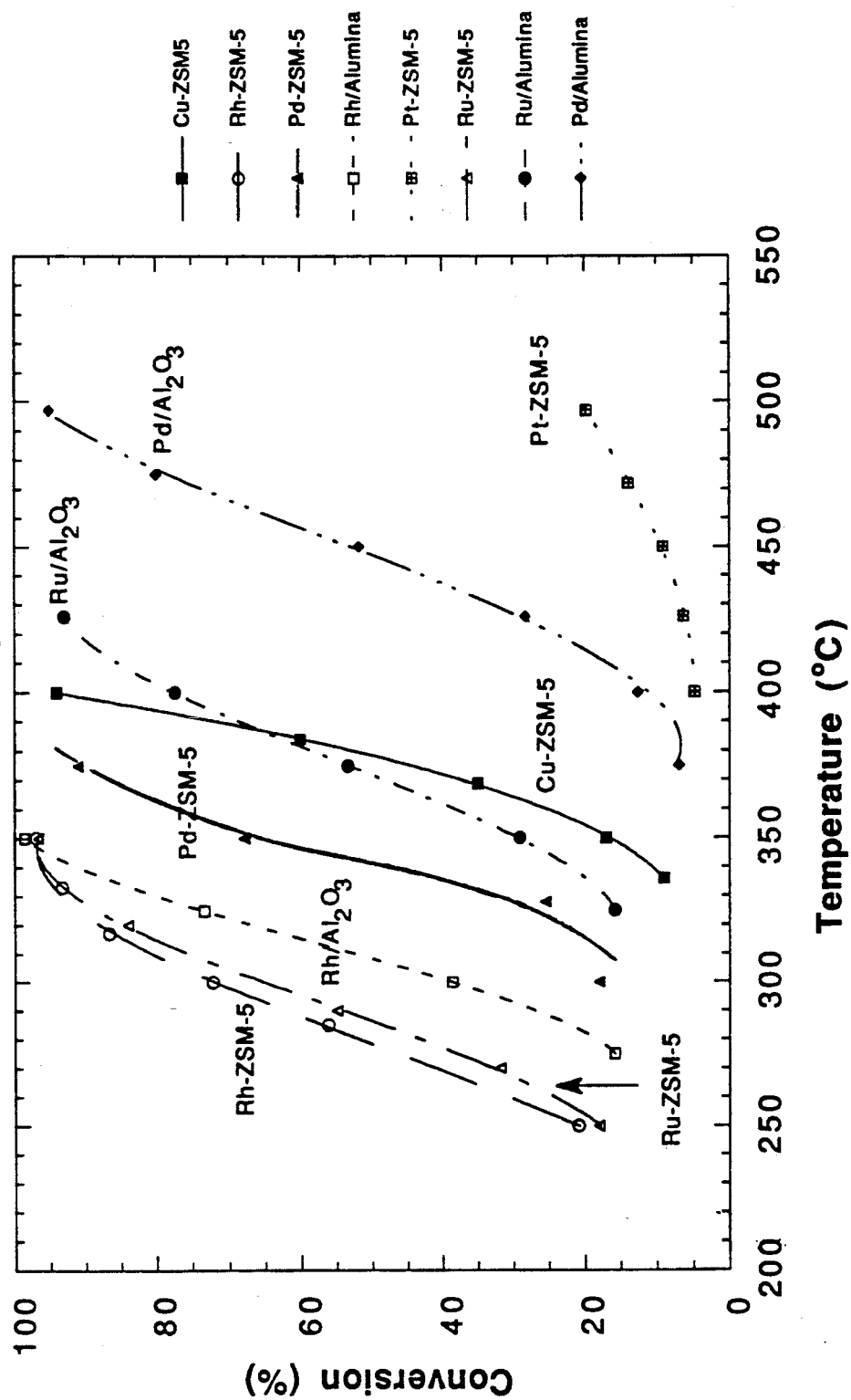
FIG. 3 Catalyst Activities for $N_2O$ Decomposition on Noble-metal-exchanged ZSM-5

CATALYTIC DECOMPOSITION OF $N_2O$

TECHNICAL FIELD OF THE INVENTION

The present invention describes a highly efficient pollution control process for catalytically converting nitrous oxide ($N_2O$) into nitrogen gas and oxygen gas. The catalysts comprise particular crystalline zeolites which are at least partially exchanged with a metal selected from copper, cobalt, rhodium, iridium, ruthenium or palladium.

BACKGROUND OF THE INVENTION

In the past, nitrous oxide ($N_2O$) has received little attention as an atmospheric pollutant and has not been considered a constituent of the gaseous pollutants collectively referred to as nitrogen oxides ($NO_x$) which have received wide attention as pollutants harmful to the environment. However, recent studies indicate that $N_2O$ in the Earth's atmosphere may be increasing by about 0.2% per year and that this increase appears to be caused by anthropogenic activity.

$N_2O$ is a major stratospheric source of NO, has been linked to the destruction of the ozone layer and is recognized to be a green-house gas. Because $N_2O$ has an atmospheric lifetime of approximately 150 years, a strong effort is underway to identify sources of the pollutant and to limit further production of the harmful gas. Recent reports such as an article by Thiemens and Trogler, Science, 251(1991)932 suggest that various industrial processes significantly contribute to the increased levels of $N_2O$ found in the Earth's atmosphere.

For example, nitrous oxide is a by-product in the manufacture of monomers for producing 6,6- and 6,12-nylon. Approximately $1.24 \times 10^9$ kg of nylon were produced in the United State in 1898, alone. Nylon polymers are typically formed by condensation polymerization of a dicarboxylic acid and a diamine. The most widely used dicarboxylic acid, adipic acid, is prepared primarily by air oxidation of cyclohexane to form a cyclohexanol/cyclohexanone mixture followed by oxidation with $HNO_3$ to form adipic acid and $N_2O$.

According to calculations by Thiemens and Trogler, the reaction stoichiometry for producing $N_2O$ in the preparation of adipic acid is about 1 mol of $N_2O$ per mole of adipic acid. Assuming a global yearly adipic acid production of $2.2 \times 10^9$ kg yr$^{-1}$, about $1.5 \times 10^{10}$ mol yr$^{-1}$ of $N_2O$ by-product or 10% of the annual atmospheric $N_2O$ increase can be attributed to this single process.

According to the NOx information Book, March, 1983, DOE/NBB-0044, prepared for the U.S. Department of Energy, $N_2O$ was not previously considered a major atmospheric pollutant. For example, Chapter 2, "Characteristics and Origins of Oxides of Nitrogen", states that the term 'NOx' is used in the air quality field to signify NO and $NO_2$. The reference also states that "$N_2O$ is not considered an air pollutant, but it is a principal reactant in upper atmospheric reactions decomposing ozone". This preliminary data may explain why $N_2O$ emissions are not currently regulated by the Environmental Protection Agency.

Several catalysts have been studied for $N_2O$ decomposition. However, the objective of most of the literature studies was to develop an understanding of catalytic mechanisms. Slinkin and coworkers, *Kinetika i Kataliz*, 19(1978)992 and 20(1979)515, studied the catalytic decomposition of $N_2O$ over dealuminized H-mordenites and mordenites containing nickel cations. The investigators reported reaction rates of $1.5 \times 10^{-5}$ mol g$^{-1}$h$^{-1}$ for H-mordenite and $9.5 \times 10^{-6}$ mol g$^{-1}$h$^{-1}$ for Ni-mordenite at 450° C.

Hall and coworkers, *J. Catal.*, 86(1984)392, studied the catalytic decomposition of $N_2O$ over various iron-exchanged catalysts. Iron-exchanged Y zeolite provided a rate of $5.5 \times 10^{-6}$ mol g$^{-1}$h$^{-1}$ at 498° C., and iron-exchanged mordenite provided a rate of $2.6 \times 10^{-4}$ mol g$^{-1}$h$^{-1}$ at the same temperature. Neither Na-M nor Na-Y performed as catalysts in the subject reaction.

Pomonis and coworkers, *J. Chem. Soc., Farady Tran.*, 81(1985)2043, studied $Fe_2O_3/Al_2O_3$ as a catalyst for $N_2O$ decomposition. At 500° C. and a space velocity of about 3,000 h$^{-1}$, a conversion of less than 1% $N_2O$ was obtained which is equivalent to a reaction rate of $1.4 \times 10^{-5}$ mol g$^{-1}$h$^{-1}$ at [$N_2O$] of 1000 ppm.

Dumesic and coworkers, *J. Catal.*, 110(1988)330, studied $N_2O$ decomposition over cation-exchanged Y zeolites (Fe—Y, FeEu—Y, Eu—Y, FeLa—Y, La—Y, Cu—Y, Co—Y, Cr—Y, Ni—Y and Mn—Y). Among these catalysts, FeEu—Y and Cu—Y were most active. At 450° C., the reaction rates were $1.8 \times 10^{-4}$ and $1.4 \times 10^{-4}$ mol g$^{-1}$h$^{-1}$, for FeEu—Y and Cu—Y, respectively.

Panov and coworkers, *J. Mol. Catal.*, 61(1990)85, recently reported that FeZSM-5 was much more active than $Fe_2O_3$, Fe—Y and Fe-mordenite in the decomposition of $N_2O$ to gaseous nitrogen and oxygen. Comparison of these rates with the steady-state reaction rates of others is difficult because the investigators utilized a static system for their reaction.

Since $N_2O$ is now considered an environmental pollutant due to its contribution to the greenhouse effect and to its catalytic effect on the destruction of the stratospheric ozone layer, an urgent need exists to develop catalytic processes for destroying $N_2O$ emissions prior to venting commercial process effluent streams into the atmosphere. Although catalytic decomposition of $N_2O$ has been studied extensively in academic institutions, no commercially viable process is known for decomposing $N_2O$ into its respective components, namely gaseous nitrogen and gaseous oxygen.

BRIEF SUMMARY OF THE INVENTION

The present invention relates to a process for catalytically removing $N_2O$ from exhaust streams which utilizes a unique and unobvious class of catalysts. The process comprises reacting the $N_2O$-containing stream in the presence of an effective amount of an enumerated catalyst under conditions sufficient to convert the $N_2O$ to gaseous nitrogen and gaseous oxygen.

Applicants have discovered that high conversion of $N_2O$ to its corresponding decomposition products can be achieved by utilizing a catalytic system comprising a crystalline zeolite having a structure type which, at least in part, is composed of five-membered rings selected from the group consisting of BETA, MOR, MFI, MEL and FER wherein the crystalline zeolite has a metal component which has been at least partially ion-exchanged with a metal or an oxide of a metal selected from the group consisting of copper, cobalt, rhodium, iridium, ruthenium and palladium.

The crystalline zeolites provide a favorable environment for the active metal catalysts such that unexpectedly improved catalytic activity is achieved over known processes employing active metal catalysts which are exchanged onto amorphous or crystalline supports other than those disclosed by the Applicants.

Typical amounts of the active metals to be exchanged onto the subject crystalline zeolites range from 0.01 to about 15 wt % based upon the total weight of the catalyst. The process is typically run at temperatures ranging from about 200° C. to 800° C. and pressures between 0.1 and 300 atmospheres. The process according to this invention can be run under a wide variety modes including in a fixed bed reactor utilizing a gas hourly space velocity ranging from 1,000 hr$^{-1}$ to 300,000 hr$^{-1}$.

Applicants' process and the results obtained therefrom are most unexpected in view of the collective teachings of the prior art. Prior to this invention, no long lived, catalytic process employing metal-exchanged crystalline zeolites as catalysts was known for effectively destroying $N_2O$ in an oxygen-containing combustion product.

BRIEF DESCRIPTION OF THE DRAWINGS

FIG. 1 compares reaction conversion of $N_2O$ to gaseous nitrogen and oxygen over various catalysts as a function of temperature.

FIG. 2 illustrates catalyst activities for $N_2O$ decomposition over various metal-exchanged zeolite catalysts.

FIG. 3 is illustrates catalyst activities for $N_2O$ decomposition over various noble metal-exchanged zeolites.

DETAILED DESCRIPTION OF THE INVENTION

The present invention relates to a highly efficient catalytic process for converting nitrous oxide ($N_2O$) into environmentally safe products, namely gaseous oxygen and gaseous nitrogen. The process utilizes a unique catalyst system formed from two components, an active metal component and a crystalline zeolite support having a specified morphology. While the zeolite is substantially noncatalytic toward the decomposition reaction in the absence of the metal component, the unique structure of the zeolites of the present invention provide unexpectedly superior conversion than other supports known in the art.

More particularly, the crystalline zeolites provide a favorable environment for the active metal catalysts such that unexpectedly improved catalytic activity under moderate reaction conditions is achieved over known processes employing active metal catalysts which are exchanged onto amorphous or crystalline supports other than those disclosed by the Applicants.

The process for destroying nitrous oxide comprises contacting a gaseous mixture containing the nitrous oxide with a catalyst under conditions sufficient to convert the nitrous oxide to gaseous nitrogen and gaseous oxygen wherein the catalyst comprises a crystalline zeolite having a structure type selected from the group consisting of BETA, MOR, MFI, MEL and FER wherein the crystalline zeolite has a metal component which has been modified, at least in part, by ion-exchange, with a metal selected from the group consisting of copper, cobalt, rhodium, iridium, ruthenium and palladium.

The enumerated crystalline zeolites according to the present invention represent structures having a unique morphology. Each zeolite is composed, at least in part, of five-membered rings which form portions of the channels within the zeolite. The zeolites of the present invention contain five-membered rings as secondary building units. Secondary building units are the smallest groupings of linked tetrahedra which comprise the three dimensional zeolite framework structure. The concept of secondary building units is described in D. W. Breck, Zeolite Molecular Sieves, p. 46, (John Wiley & Sons, 1974). Such five membered rings may also exist in combination with smaller or larger rings.

Specific crystalline zeolites which possess such five-membered rings and which are suitable for ion exchange with the metals according to the present invention include zeolites falling under the IUPAC designation (MOR). Representative zeolites of the (MOR) designation include, but are not limited to, mordenite, Na-D, Ptilolite and Zeolon. Zeolites under the IUPAC designation (MFI) include, but are not limited to ZSM-5, Silicalite-1, Silicalite, Zeta-1, Zeta-3, NU-3, NU-4 and AZ-1. Zeolites under the (MEL) designation include ZSM-11 and Silicalite-2 and zeolites under the (FER) designation include ferrierite.

Additional zeolites suitable for practicing the present invention which possess the required channels formed from five-membered rings include naturally occurring zeolites such as dachiardite, epistilbite and bikitaite and synthetic zeolites such as theta-1, sigma-2, EU-1, mazzite, ECR-1, ZSM-39, ZSM-23 and ZSM-12. Boron- or gallium-substituted pentasil framework structures such as Boralite, AMS-1B and AMS-2B are also suitable for practicing the present invention.

The crystalline zeolites of the present invention can be used either in the alkali metal form, e.g., the sodium or potassium form; the ammonium form; the hydrogen form or another univalent or multivalent cationic form to the extent that such zoelites are capable of being exchanged with the metals discussed herein. Suitable crystalline zeolites falling under the enumerated IUPAC designations include those materials which are stable under the described reaction conditions.

Preferably, the crystalline zeolites to be exchanged reside in their sodium form. Typically, the pore size of the base zeolite will range from about 5 to 15 angstroms although such a range is not to be construed as limiting the scope of this invention. A preferred zeolite for practicing the present invention is ZSM-5 which can be prepared by the procedures disclosed in U.S. Pat. No. 3,702,886, I & EC 24, 507 (1985) and Shiralkar, et. al., Zeolite, 9, 363, (1989), the disclosures which are specifically incorporated by reference herein.

The term, mordenite, is meant to include those synthetic and naturally occurring zeolites having the mordenite topology as included under the general IUPAC structural code of mordenite (MOR). While naturally occurring mordenites vary widely in purity, the synthetic zeolites tend to have higher purity and controlled pore structure thereby rendering the synthetic mordenites preferable for catalytic applications.

Mordenite can be synthesized from a wide variety of starting materials of both chemical and natural origins. Synthetic mordenites are typically produced with Si/Al ratios ranging from 5 to about 12.5. Mordenite is a porous crystalline catalyst having a rigid three-dimensional anionic network with intracrystalline channels whose narrowest cross-section has essentially a uniform diameter. Mordenite is distinguished over crystalline alumino-silicate clays such as bentonite which have a two-dimensional layered structure and over alumino-silicates which are amorphous.

LZ-M-5, a synthetic mordenite residing in the non-acid, sodium cation form and an example of a MOR structure type zeolite, is commercially available from Union Carbide Corporation, Chickasaw, Ala. LZM-5 has the following chemical composition (wt % anhydrous)

| | |
|---|---|
| $SiO_2$ | 78.7 |
| $Al_2O_3$ | 12.5 |
| $Na_2O$ | 7.33 |
| $SiO_2/Al_2O_3$ (molar ratio) | 10.7 |
| $Na_2O/Al_2O_3$ (molar ratio) | 0.96 |

ZSM-11, an example of a zeolite falling under the IUPAC designation (MEL) can be prepared according to the general procedure presented in U.S. Pat. No. 3,709,979. ZSM-11 is a crystalline zeolite having the composition 0.9 ±0.3 $M_{2/n}O:W_2O_3$:20 to 90 $YO_2$:$ZH_2O$ wherein M is a cation, n is the valence of the cation, W is aluminum or gallium, Y is silicon or germanium and Z is from 6 to 12, the zeolite being characterized by specified X-ray diffraction values. The zeolite is prepared by digesting a reaction mixture comprising $(R_4X)_2O$, sodium oxide, and oxide of aluminum or gallium, an oxide of silicon or germanium, and water, $R_4X$ being a cation of a quaternary compound.

Ferrierite, an example of a zeolite under the IUPAC designation (FER) can be prepared by standard methods disclosed in the literature. Ferrierite is commercially available from TOSOH Corporation, No. 4560 Tonda, Shin-Nanyo City, Yamaguch Pref., Japan.

The original alkali metal cations of the crystalline zeolites according to this invention are replaced in accordance with techniques well known in the art such as ion-exchange, acid-base and solid state reactions. For example, the alkali metal cations of the crystalline zeolites can be replaced, at least in part, by ion-exchange with from about 0.01 wt % to about 15 wt % (based upon the total weight of the catalyst) of one or more cations selected from copper, cobalt, rhodium, iridium, ruthenium and palladium.

A suitable metal-exchange technique comprises contacting the zeolite with a solution which contains the salt of the desired replacing cation or cations. Examples of suitable salts include the halides such as chlorides, nitrates, carboxylates and sulfates. Preferred exchange solutions include cobalt(II) acetate and copper(II) nitrate.

The catalysts of this invention may be subjected to thermal treatment prior to use in the process. The thermal treatment may be conducted in the reactor prior to contacting the reactants with the catalyst or as a separate step. The thermal treatment comprises heating the catalysts of this invention to above ambient temperature, preferably between about 80° and 150° C. while under an inert atmosphere of about 1 to 220 atmospheres for a period ranging from about 0.5 to 12 hours to remove residual moisture. The catalyst may be dried during one or more periods utilizing one or more discrete temperatures or temperature ramping techniques known in the art. The dehydration can be carried out by any method capable of removing water from the catalyst without causing structural collapse of the zeolite structure.

The amount of catalyst to be utilized in the present process varies depending upon the reaction conditions (i.e., temperature, pressure and the like), and the amount of $N_2O$ residing in the process stream to be treated. Desirably, an effective amount of catalyst is used, i.e., that amount which causes a reaction to occur when $N_2O$ is placed in contact with the enumerated catalysts under the specified reaction conditions. The catalysts of the invention can be fabricated onto fire-proof supports known in the art including those customarily used in the automotive industry. A preferred support has a honeycomb design whereby surface area is maximized to enhance catalytic activity.

The process according to this invention is typically run at temperatures ranging from about 200° C. to 800° C. and pressures between about 0.1 and 300 atmospheres. However, higher temperatures may be utilized because the maximum temperature for conducting the process is limited only by the temperature stability of the zeolite itself. More particularly, the process can be advantageously run under fixed bed conditions at temperatures ranging from about 250° C. to 800° C. and a gas hourly space velocity ranging from 1,000 to 300,000 $hr^{-1}$, preferably 7,500 $hr^{-1}$ to 30,000 $hr^{-1}$.

The following examples are provided to further illustrate various embodiments of this invention and to provide a comparison between the enumerated catalysts of this invention and prior art catalysts for destroying $N_2O$ in $N_2O$-containing atmospheres in the presence and absence of oxygen. These examples are provided to illustrate the nature of the process described herein and are not intended to limit the scope of the claimed invention. Unless otherwise stated, parts and percentages in the examples are given by volume.

EXAMPLE 1

Preparation of Metal-exchanged (MOR) Structure Type Zeolites

The metal-exchanged mordenite catalysts of the present invention are prepared according to the following general procedure. By way of example, Co-LZ-M-5 was prepared by submersing fifteen grams of LZ-M-5, obtained from Union Carbide Company, Chickasaw, Ala., in a 2 liter Co(II)acetate solution (0.02M) with stirring at 80° C. for 24 hours. The resulting cobalt exchanged catalyst was washed with 2 liters of distilled water for 1 hour and filtered followed by drying at 110° C. overnight.

EXAMPLE 2

Preparation of Metal-exchanged (MFI) Structure Type Zeolites

The metal-exchanged MFI structure type catalysts of the present invention were prepared according to the following general procedure. For example, ZSM-5 was prepared according to the general procedure described in I & EC 24 (1985) 507 wherein a gel was prepared containing 30% silica solution, sodium hydroxide and aluminum hydroxide in the molar ratio of 3.9 $Na_2O$/36 $SiO_2/Al_2O_3$/720 water. The resulting gel was stirred at 165° C. in a PARR mini-reactor, filtered and washed with de-ionized water. The composition was verified by X-ray diffraction and elemental analysis.

Fifteen grams of the resulting Na-ZSM-5, (Si/Al=14) were submersed in a 3.5 liter Co(II)acetate solution (0.01M) with stirring at room temperature for 18 hours followed at 40° C. and 80° C. for 20 and 24 hours, respectively. The resulting cobalt-exchanged catalyst was washed with 3.5 liters of distilled water for 1 hour and filtered followed by drying at 110° C. for 5 hours. Elemental analysis demonstrated that the catalyst contained 4.0 wt % cobalt with a Co/Al ratio of 0.70 which corresponds to 140% of the theoretical exchange level.

EXAMPLE 3

Preparation of Metal-exchanged (MEL) Structure Type Zeolites

The metal-exchanged MEL structure type catalysts of the present invention such as ZSM-11 were prepared according to the general procedure described in U.S. Pat. No. 3,709,979.

EXAMPLE 4

Preparation of Metal-exchanged (FER) Structure Type Zeolites

The metal-exchanged (FER) structure type catalysts of the present invention were prepared according to the following general procedure. The ferrierite catalyst was converted into the pure potassium form by twice contacting the material with 1.0M KCl (50 g zeolite/liter) at 100° C. for six hours. Three grams of potassium ferrierite were slurried in 100 ml of 0.05M cobalt acetate solution and stirred at 80° C. for at least 18 hours. This exchange was repeated two more times then the catalyst was separated by filtration and dried overnight at 100° C.

EXAMPLE 5

Preparation of Precious Metal Exchanged (MFI) Structure Type Zeolites

The zeolites were prepared as described in Example 2. The precious metal was added as follows. Sodium ZSM-5 (Si/Al=14) was slurried in about 0.01M solutions of the precious metal compounds of platinum, palladium and ruthenium proportioned to achieve 1% loadings. The compounds utilized for these exchanges were tetraamineplatinium nitrate, palladium(II) acetate and ruthenium(III) chloride. The rhodium loaded ZSM-5 was prepared by slurrying in an approximately 0.033M solution proportioned to give a 4% weight loading of rhodium(III) nitrate. Each was stirred at least 18 hours then filtered and calcined at 450° C. for 3 hours.

EXAMPLE 6

Catalytic Destruction of $N_2O$ Over Metal-exchanged Crystalline Zeolites

The following general procedure was utilized for effecting the catalytic conversion of $N_2O$ to gaseous nitrogen and gaseous oxygen over the catalysts of the present invention.

A reactor was constructed having a 4 mm i.d. glass tube with an expanded section (8–13 mm i.d.) as a catalyst bed. A separate inlet for admixing oxygen with the $N_2O$ was provided at a position to enable thorough mixing just prior to contacting the reactants with the desired catalyst. The weight of catalyst used in these tests varied from a few tenths of a gram to one gram. The GHSV can be varied between 1000 and 300,000 to achieve desired conversion levels. The reactor was surrounded by a temperature-controlled furnace. The temperature was monitored by a chromel-alumel thermocouple which was in contact with the catalyst bed.

The activity measurements were made with a microcatalytic reactor in a steady-state flow mode. Product analysis was obtained using an on-line gas chromatograph with a thermal conductivity detector. The separation column was packed with 5A molecular sieve (80/100 mesh) and was 4 feet long having a ⅛" outer diameter. Chromatograph temperature was 25° C. and the flow rate of the carrier gas was 30 cm$^3$/min.

The $N_2O$ decomposition was carried out at ambient pressure. 0.1 g of catalyst in a plug-flow reactor was used for each run. The flow rate of the feed was 100 cm$^3$/min and remained constant resulting in a gas hourly space velocity (GHSV) of 30,000 h$^{-1}$. The reaction temperatures studied ranged from 200° to about 800° C. The catalysts studied were dried for one hour at 400° to 500° C. over a helium stream prior to use.

PRESENTATION OF DATA

The catalysts according to Examples 1 through 4 and various prior art catalysts were tested according to the procedure of Example 5 for catalytic reduction of $N_2O$ in the absence of oxygen and in the presence of oxygen. Reaction conditions were maintained constant using a feedstream of 0.1% $N_2O$ and 99.9% helium. A $N_2O$ feedstream containing 2.5% oxygen was used in experiments on the effect of oxygen on catalyst activity.

The results presented in Table 1 and graphically depicted in FIG. 1 compare reaction conversion of $N_2O$ to gaseous nitrogen and oxygen for various catalysts as a function of temperature. The results demonstrate that Cu-ZSM-5 (Run 1) provides unexpectedly high conversion (94%) of $N_2O$ to gaseous nitrogen and oxygen at 400° C. compared to Cu-Y (Run 2) and Cu/Al$_2$O$_3$ (Run 3) which demonstrated conversions of 10% and 5%, respectively. Likewise, Co-ZSM-5

TABLE 1

COMPARISON OF $N_2O$ CONVERSION OVER VARIOUS METAL CATALYSTS AS A FUNCTION OF TEMPERATURE

| Run | Catalyst | Temp (°C.) 400 | 450 | 500 | Ea (Kcal/nol) | Metal Loading (wt %) |
|---|---|---|---|---|---|---|
| 1 | Cu-ZSM-5 | 94 | N/A | N/A | 32 | 4.0 |
| 2 | Cu—Y | 10 | 16 | 29 | 11 | 9.6 |
| 3* | Cu/Al$_2$O$_3$ | 5 | 19 | 69 | 29 | 4.0 |
| 4* | Cu-L | N/A | 7 | N/A | N/A | N/A |
| 5 | Co-ZSM-5 | 51 | N/A | N/A | 32 | 4.0 |
| 6* | Co—Y | 4 | 7 | 14 | 16 | 11.8 |
| 7* | Co-L | 16 | 37 | N/A | N/A | 3.5 |
| 8* | Co/Al$_2$O$_3$ | 7 | 12 | 31 | 15 | 10.0 |
| 9 | Fe-ZSM-5 | 7 | 20 | 66 | 27 | 1.0 |
| 10 | Ni-ZSM-5 | — | 5 | 12 | 19 | 4.3 |
| 11 | Mn-ZSM-5 | — | — | 5 | 24 | 3.0 |
| 12 | Na-ZSM-5 | — | — | — | — | 2.5 |

N/A: Data not available
—: No activity detected
Ea: Activation energy (a parameter reflecting the degree of temperature dependency on reaction rate)
*Comparative Example (Run 5) provided unexpectedly superior conversion at 400° C. compared to Co-Y (Run 6), Co-L (Run 7) and Co/Al$_2$O$_3$. Runs 8 through 10 demonstrate that reaction conversion is highly dependent upon the particular metal exchanged onto the crystalline zeolite. Run 11 confirms that the sodium exchanged ZSM-5 catalyst, in the absence of metal exchange possess essentially no catalytic activity for the subject reaction.

Table 2 provides a comparison of conversions achieved by reacting $N_2O$ over cobalt- and copper-exchanged ZSM-5 in the presence of 2.5% oxygen in the $N_2O$ feedstream and in the absence of oxygen in the $N_2O$ feedstream. The data presented in Table 2 demonstrate that the process for converting $N_2O$ to gaseous nitrogen and oxygen is substantially unaffected by the presence of oxygen in the feedstream. Runs 13 through 17 demonstrate that average conversion of $N_2O$ over cobalt-exchanged ZSM-5 at 410° C. using a feedstream containing 2.5% oxygen was 62.2% versus 59.6% in the absence of oxygen in the feedstream. Runs 18 through 25 demonstrate that average conversion of $N_2O$ over copper-exchanged ZSM-5 at 400° C. using a feedstream containing 2.5% oxygen was 83.4% versus 91.0% in the absence of oxygen in the feedstream.

TABLE 2

EFFECT OF OXYGEN ADDITION ON ACTIVITY OF METAL-EXCHANGED ZSM-5 CATALYSTS

| Run | Catalyst | Temp (°C.) | Activity Without $O_2$ | Activity With $O_2$ |
|---|---|---|---|---|
| 13 | Co-ZSM-5 | 410 | 57 | 63 |
| 14 | Co-ZSM-5 | 410 | 58 | 63 |
| 15 | Co-ZSM-5 | 410 | 62 | 61 |
| 16 | Co-ZSM-5 | 410 | 62 | 62 |
| 17 | Co-ZSM-5 | 410 | 59 | 62 |
| 18 | Cu-ZSM-5 | 400 | 94 | 83 |
| 19 | Cu-ZSM-5 | 400 | 94 | 87 |
| 20 | Cu-ZSM-5 | 400 | 94 | 82 |
| 21 | Cu-ZSM-5 | 400 | 95 | 82 |
| 22 | Cu-ZSM-5 | 400 | 82 | 85 |
| 23 | Cu-ZSM-5 | 400 | 89 | 83 |
| 24 | Cu-ZSM-5 | 400 | 88 | 85 |
| 25 | Cu-ZSM-5 | 400 | 92 | 80 |

Table 3 illustrates catalyst activities for $N_2O$ decomposition over metal-exchanged zeolite catalysts. The data is graphically depicted in FIG. 2. Each Run demonstrates that higher conversions were achieved overall when reaction temperature was elevated from 350° C. to 400° C. Comparative examples 30 and 31 demonstrate that zeolites which do not possess a structure including five-membered rings provide poor conversion. While each of the catalysts of the present invention provided a substantial degree of conversion, copper-exchanged ZSM-5 (Run 34) provided 94% conversion at 400° C.

TABLE 3

CATALYST ACTIVITIES FOR $N_2O$ DECOMPOSITION OVER METAL-EXCHANGED MORDENITE AND ZEOLITE BETA

| Run | Catalyst | Metal Loading (wt %) | Conversion 350° C. | Conversion 400° C. |
|---|---|---|---|---|
| 26 | Co-M | 5.6 | 16 | 49 |
| 27 | Co-BETA | 2.3 | 23 | 67 |
| 28 | Co-ZSM-5 | 3.6 | 11 | 51 |
| 29 | Co—Y | 11.8 | — | 4 |
| 30* | Co-Erionite | 4.5 | — | 15 |
| 31* | Co-L | 3.5 | — | 16 |
| 32 | Cu-M | 6.5 | 8 | 37 |
| 33 | Cu-BETA | 3.6 | 24 | 58 |
| 34 | Cu-ZSM-5 | 3.7 | 17 | 94 |
| 35 | Co-Ferrierite | 7.6 | 11 | 35 |
| 36 | Co-ZSM-11 | 3.7 | 14 | 35 |

*Comparative Example
— No activity detected

Table 4 demonstrates catalyst activities for $N_2O$ decomposition over various noble metal-exchanged zeolites. The data are graphically depicted in FIG. 3. Runs 37, 39 and 41 demonstrate that exceptionally high conversion was achieved using rhodium-, palladium-, and ruthenium-exchanged ZSM-5 when the process was run at 350° C. In contrast, platinum-exchanged ZSM-5 (Run 41) demonstrated no catalytic activity under the cited conditions. Comparative Runs 38, 40 and 42 demonstrate that the subject metals provide very poor conversion when deposited onto amorphous alumina. The expected results obtained by the present invention are evident when a direct comparison is made between the conversions obtained by using Applicants' zeolite based catalysts which contain the enumerated five-membered rings versus catalysts based upon alumina.

TABLE 4

CATALYST ACTIVITIES FOR $N_2O$ DECOMPOSITION OVER NOBLE-METAL-EXCHANGED ZSM-5

| Run | Catalyst | Metal Loading (wt %) | Conversion 300° C. | Conversion 350° C. |
|---|---|---|---|---|
| 37 | Rh-ZSM-5 | 0.6 | 72 | 98 |
| 38* | Rh—$Al_2O_3$ | 1.2 | 39 | N/A |
| 39 | Pd-ZSM-5 | 3.4 | 24 | 68 |
| 40* | Pd—$Al_2O_3$ | 4.2 | — | <5 |
| 41 | Ru-ZSM-5 | 0.6 | 64 | 97 |
| 42* | Ru—$Al_2O_3$ | 1.0 | N/A | 29 |
| 43 | Pt-ZSM-5 | 2.6 | — | — |
| 44 | Cu-ZSM-5 | 3.7 | N/A | 17 |

*Comparative Example
N/A: Data not available.
— No activity detected

Table 5 provides a comparison of conversions achieved by reacting $N_2O$ over noble-metal exchanged ZSM-5 in the presence of 2.5% oxygen in the $N_2O$ feedstream and in the absence of oxygen in the $N_2O$ feedstream. The data presented in Table 5 demonstrate that the process for converting $N_2O$ to gaseous nitrogen and gaseous oxygen is substantially unaffected by the presence of 2.5% oxygen in the $N_2O$ feedstream. The data also illustrate that conversion of $N_2O$ over rhodium-exchanged ZSM-5 (Run 43) and palladium-exchanged ZSM-5 (Run 44) at 400° C. was not affected by the presence of 2.5% oxygen in the process feedstream.

TABLE 5

EFFECT OF OXYGEN ADDITION ON ACTIVITY OF NOBLE-METAL EXCHANGED ZSM-5

| Run | Catalyst | Temp (°C.) | Activity Without $O_2$ | Activity With $O_2$ |
|---|---|---|---|---|
| 45 | Rh-ZSM-5 | 350 | 98 | 90 |
| 46 | Pd-ZSM-5 | 374 | 91 | 91 |
| 47 | Ru-ZSM-5 | 350 | 97 | 37 |

The enumerated catalysts of the present invention provide several improvements over prior art processes for removing $N_2O$ from combustion processes. First, the claimed catalysts are unexpectedly more active than prior art catalysts in converting $N_2O$ to nitrogen gas and oxygen gas. Second, the catalysts are not significantly deactivated in the presence of oxygen in the process feedstream.

Having thus described the present invention, what is now deemed appropriate for Letters Patent is set forth in the following Claims.

What is claimed is:

1. A process for removing nitrous oxide from a gaseous mixture comprising: contacting the gaseous mixture containing the nitrous oxide with a catalyst under conditions sufficient to convert the nitrous oxide to gaseous nitrogen and gaseous oxygen wherein the catalyst comprises a crystalline zeolite having a structure type selected from the group consisting of BETA, MOR, MFI, MEL and FER which has been at least partially ion exchanged with a metal selected from the group consisting of copper, cobalt, rhodium, iridium, ruthenium and palladium.

2. The process according to claim 1 wherein the crystalline zeolite has been exchanged with from 0.01 to about 15 wt % of the metal based upon the total weight of the catalyst.

3. The process according to claim 2 wherein the reacting is conducted at temperatures ranging from 200° to 800° C. and pressures ranging from 0.1 to 300 atmospheres.

4. The process according to claim 3 wherein the reacting is conducted in a fixed bed reactor with a gas hourly space velocity ranging from 1,000 hr$^{-1}$ to 300,000 hr$^{-1}$.

5. The process according to claim 4 wherein the MOR structure type crystalline zeolite is selected from the group consisting of a synthetic mordenite, a natural mordenite, Na-D and ptilolite.

6. The process according to claim 4 wherein the MFI structure type crystalline zeolite is selected from the group consisting of ZSM-5, Silicalite-1, Silicalite, Zeta-1, Zeta-3, NU-4, NU-5 and AZ-1.

7. The process according to claim 4 wherein the MEL structure type crystalline zeolite is selected from the group consisting of ZSM-11 and silicalite-2.

8. The process according to claim 4 wherein the FER structure type crystalline zeolite is ferrierite.

9. A process for removing nitrous oxide from a gaseous mixture comprising: contacting the gaseous mixture containing the nitrous oxide with a catalyst under conditions sufficient to convert the nitrous oxide to gaseous nitrogen and gaseous oxygen wherein the catalyst comprises a crystalline zeolite represented by the MFI structure which has been at least partially ion exchanged with a metal selected from the group consisting of copper, cobalt, rhodium, iridium, ruthenium and palladium.

10. The process according to claim 9 wherein the crystalline zeolite has been ion exchanged with from 0.01 to about 15 wt % of the metal based upon the total weight of the catalyst.

11. The process according to claim 10 wherein the reacting is conducted at temperatures ranging from 200° to 800° C. and pressure ranging from 0.1 to 300 atmospheres.

12. The process according to claim 11 wherein the reacting is conducted in a fixed bed reactor with a gas hourly space velocity from 1,000 hr$^{-1}$ to 300,000 hr$^{-1}$.

13. The process according to claim 12 wherein the MFI structure type crystalline zeolite has been ion exchanged with from 0.01 to about 15 wt % of copper based upon the total weight of the catalyst.

14. The process according to claim 12 wherein the MFI structure type crystalline zeolite has been exchanged with from 0.01 to about 15 wt % of cobalt based upon the total weight of the catalyst.

15. The process according to claim 12 wherein the MFI structure type crystalline zeolite has been exchanged with from 0.01 to about 15 wt % of rhodium based upon the total weight of the catalyst.

16. The process according to claim 12 wherein the MFI structure type crystalline zeolite has been exchanged with from 0.01 to about 15 wt % of ruthenium based upon the total weight of the catalyst.

17. The process according to claim 12 wherein the MFI structure type crystalline zeolite has been exchanged with from 0.01 to about 15 wt % of palladium based upon the total weight of the catalyst.

18. The process according to claim 12 wherein the MFI structure type crystalline zeolite has been exchanged with from 0.01 to about 15 wt % of iridium based upon the total weight of the catalyst.

19. A process for removing nitrous oxide from a gaseous mixture comprising: contacting the gaseous mixture containing the nitrous oxide with a catalyst under conditions sufficient to convert the nitrous oxide to gaseous nitrogen and gaseous oxygen wherein the catalyst comprises a ZSM-5 crystalline zeolite which has been at least partially ion exchanged with a metal selected from the group consisting of copper, cobalt, rhodium, iridium, ruthenium and palladium.

20. The process according to claim 19 wherein the zeolite has been exchanged with from 0.01 to about 15 wt % of the metal based upon the total weight of the catalyst.

21. The process according to claim 20 wherein the reacting is conducted at temperatures ranging from 200° to 800° C. and pressures ranging from 0.01 to 300 atmospheres.

22. The process according to claim 21 wherein the reacting is conducted in a fixed bed reactor with a gas hourly space velocity ranging from 1,000 hr$^{-1}$ to 100,000 hr$^{-1}$.

* * * * *